United States Patent
Kobayashi

(10) Patent No.: US 9,857,588 B2
(45) Date of Patent: *Jan. 2, 2018

(54) DISPLAY DEVICE, HEAD MOUNTED DISPLAY, DISPLAY SYSTEM, AND CONTROL METHOD FOR DISPLAY DEVICE

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,104

(22) Filed: Jul. 11, 2014

(65) Prior Publication Data

US 2015/0035728 A1    Feb. 5, 2015

(30) Foreign Application Priority Data

Aug. 1, 2013  (JP) .................................. 2013-160209

(51) Int. Cl.
*G02B 27/01* (2006.01)

(52) U.S. Cl.
CPC ...... *G02B 27/017* (2013.01); *G02B 2027/014* (2013.01); *G02B 2027/0138* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| 5,745,109 A | 4/1998 | Nakano et al. |
| 6,002,403 A | 12/1999 | Sugiyama et al. |
| 6,005,579 A | 12/1999 | Sugiyama et al. |
| 6,043,818 A | 3/2000 | Nakano et al. |
| 6,600,461 B1 | 7/2003 | Okauchi et al. |
| 9,041,740 B2 | 5/2015 | Sugiyama et al. |
| 2006/0146125 A1 | 7/2006 | Yamada |
| 2007/0132662 A1 | 6/2007 | Morita |
| 2009/0150775 A1 | 6/2009 | Miyazaki et al. |
| 2011/0032492 A1 | 2/2011 | Nara |

(Continued)

FOREIGN PATENT DOCUMENTS

| EP | 2530510 A2 | 12/2012 |
| JP | H05-328258 A | 12/1993 |

(Continued)

OTHER PUBLICATIONS

Dec. 1, 2014 Search Report issued in International Patent Application No. PCT/JP2014/004050.

(Continued)

*Primary Examiner* — David D Davis
(74) *Attorney, Agent, or Firm* — Oliff PLC

(57) ABSTRACT

A transmission type head mounted display allows a user to visually recognize a display screen as a virtual image, and includes a display control portion that displays a plurality of icons for calling respective applications on the display screen, and a display section that displays the plurality of icons, in which the display control portion displays the plurality of icons in retreating regions which avoid a view field securing region of the display screen.

18 Claims, 4 Drawing Sheets

(56) References Cited

U.S. PATENT DOCUMENTS

| | | | |
|---|---|---|---|
| 2011/0083103 A1 | 4/2011 | Shim et al. | |
| 2012/0069055 A1 | 3/2012 | Otsuki et al. | |
| 2012/0200592 A1 | 8/2012 | Kimura | |
| 2012/0218303 A1* | 8/2012 | Nakada | G02B 27/017 345/649 |
| 2012/0235900 A1 | 9/2012 | Border et al. | |
| 2012/0306940 A1 | 12/2012 | Machida et al. | |
| 2013/0176335 A1* | 7/2013 | Sugiyama | B60K 35/00 345/633 |
| 2013/0249945 A1* | 9/2013 | Kobayashi | G06T 19/006 345/633 |
| 2015/0035727 A1* | 2/2015 | Kobayashi | G09G 3/003 345/8 |
| 2015/0035728 A1 | 2/2015 | Kobayashi | |
| 2016/0018658 A1 | 1/2016 | Machida et al. | |
| 2016/0163109 A1* | 6/2016 | Kobayashi | G06F 3/011 345/633 |
| 2016/0321970 A1 | 11/2016 | Kobayashi | |
| 2017/0003852 A1 | 1/2017 | Miyazaki et al. | |

FOREIGN PATENT DOCUMENTS

| | | |
|---|---|---|
| JP | 2005-084569 A | 3/2005 |
| JP | 2005-343351 A | 12/2005 |
| JP | 2005-346177 A | 12/2005 |
| JP | A-2005-339267 | 12/2005 |
| JP | 2007-296889 A | 11/2007 |
| JP | 2009-087368 A | 4/2009 |
| JP | 2009-157908 A | 7/2009 |
| JP | 2009-227245 A | 10/2009 |
| JP | 2010-098567 A | 4/2010 |
| JP | B2-4984771 | 7/2012 |
| JP | A-2012-163637 | 8/2012 |
| JP | 2012-252091 A | 12/2012 |
| WO | 2013-052855 A2 | 4/2013 |

OTHER PUBLICATIONS

Patterson, Robert. "Human Factors of 3-D Displays". Journal of the Society for Information Display, vol. 15/11, pp. 861-871, 2007.
Nov. 17, 2015 Office Action issued in U.S. Appl. No. 14/328,065.
Apr. 13, 2016 Notice of Allowance issued in U.S. Appl. No. 14/328,065.
Sep. 6, 2016 Notice of Allowance issued in U.S. Appl. No. 15/208,992.
May 4, 2017 Office Action Issued in U.S Appl. No. 14/905,306.
Sep. 8, 2017 Office Action Issued in U.S. Appl. No. 14/905,306.

* cited by examiner

DISPLAY DEVICE, HEAD MOUNTED DISPLAY, DISPLAY SYSTEM, AND CONTROL METHOD FOR DISPLAY DEVICE

BACKGROUND

1. Technical Field

The present invention relates to a transmission type display device which allows a user to visually recognize a display screen as a virtual image, a head mounted display, a display system, and a control method for the display device.

2. Related Art

In the related art, for this kind of transmission type display device, an optical transmission type head mounted display which is mounted on the head of a user is known (refer to JP-A-2012-163637). In this display device, the user can visually recognize an image as a virtual image and can also directly visually recognize external scenery (real scenery).

However, in the display device of the related art, there is a problem in that a view field is hindered by a plurality of icons for calling applications, and thus visibility of external scenery considerably deteriorates. Particularly, if the plurality of icons are displayed at a center of the view field, it is hard to visually recognize the external scenery.

SUMMARY

An advantage of some aspects of the invention is to provide a display device, a head mounted display, a display system, and a control method for the display device, capable of improving visibility of external scenery.

An aspect of the invention is directed to a transmission type display device which allows a user to visually recognize a display screen as a virtual image, the display device including a display control section that displays a plurality of image objects for calling respective applications on the display screen; and a display section that displays the plurality of image objects, in which the display control section displays the plurality of image objects in retreating regions which avoid a view field securing region of the display screen.

Another aspect of the invention is directed to a transmission type head mounted display which is mounted on the head of a user and allows the user to visually recognize a display screen as a virtual image, the head mounted display including a display control section that displays a plurality of image objects for calling respective applications on the display screen; and a display section that displays the plurality of image objects, in which the display control section displays the plurality of image objects in retreating regions which avoid a view field securing region of the display screen.

Still another aspect of the invention is directed to a transmission type display system which allows a user to visually recognize a display screen as a virtual image, the display system including a display control section that displays a plurality of image objects for calling respective applications on the display screen; and a display section that displays the plurality of image objects, in which the display control section displays the plurality of image objects in retreating regions which avoid a view field securing region of the display screen.

Yet another aspect of the invention is directed to a control method for a transmission type display device which allows a user to visually recognize a display screen as a virtual image, the method including displaying a plurality of image objects for calling respective applications on the display screen; and displaying the plurality of image objects, in which, in the displaying of the plurality of image objects, the plurality of image objects are displayed in retreating regions which avoid a view field securing region of the display screen.

According to these configurations, a region (view field securing region) for which a view field is desired to be secured is set, and a plurality of image objects are displayed only in the retreating regions of the display screen avoiding the view field securing region. Therefore, it is possible to prevent the view field from being hindered by the plurality of image objects to the utmost. In other words, a region where external scenery is viewed can be secured, and thus it is possible to improve visibility of the external scenery.

In the display device described above, it is preferable that the view field securing region is a central region of the display screen.

According to this configuration, it is possible to secure a view field for the center of the display screen and thus to further improve visibility of external scenery. In addition, the "center" described here may be a center in a vertical direction of the display screen, and may be a center in a horizontal direction of the display screen. Further, the center may be a center in both of the vertical direction and the horizontal direction.

In this case, it is preferable that the display control section displays the plurality of image objects which are converted into inward or outward perspective images with respect to the view field securing region by using perspective, on the display screen.

According to this configuration, each image object is in perspective, and thus the image object can be made smaller than an image object which is not in perspective. Therefore, a region where the plurality of image objects are arranged can be reduced, and thus a wider region where external scenery is viewed can be secured. Furthermore, the image object can be more naturally differentiated than in a case where the image object is simply reduced.

It is preferable that the display device further includes a mode setting section that sets a mode to a first mode or a second mode, in which the display control section displays the plurality of image objects in the retreating region when the first mode is set, and displays at least some of the plurality of image objects in the view field securing region when the second mode is set.

According to this configuration, there can be appropriate changing between a mode (first mode) in which a plurality of image objects are displayed only in the retreating regions and visibility of external scenery is prioritized and a mode (second mode) in which at least some of the plurality of image objects are displayed in the view field securing region and operability of the image objects is prioritized, and thus it is possible to improve convenience of the display device.

It is preferable that the plurality of image objects are any one of icons, menus, and reduced application screens.

According to this configuration, the icons, menus, and reduced application screens can be displayed without blocking a view field.

It is preferable that the retreating regions are one of upper and lower retreating regions which retreat to upper and lower sides of the view field securing region so as to avoid the view field securing region, and left and right retreating regions which retreat to left and right sides of the view field securing region so as to avoid the view field securing region.

According to this configuration, it is possible to obtain higher visibility than in a configuration in which a plurality of image objects are displayed in both of the upper and lower retreating regions and the left and right retreating regions.

It is preferable that the display control section displays a background of the display screen in a transmission manner.

According to this configuration, since the background of the display screen is displayed in a transmission manner, visibility of external scenery can be further improved. In addition, the background may be displayed in a total transmission manner, and may be displayed in a half transmission manner.

It is preferable that the display device further includes an object detection section that detects a position of a predetermined real object within a view field of the user, in which, on the basis of a detection result from the object detection section, the display control section displays the plurality of image objects in the retreating regions when the predetermined real object is located in the view field securing region, and displays the plurality of image objects in the view field securing region when the predetermined real object is located in the retreating regions.

According to this configuration, it is possible to secure a view field for a position of the predetermined real object (for example, an obstacle) present in the real space, and thus the user can look at the real object.

It is preferable that the display section includes an image light output unit that outputs image light; and a lightguide unit that guides the output image light to the eyes of the user, in which the lightguide unit transmits external light therethrough, and makes the external light incident to the eyes of the user along with the image light.

According to this configuration, a so-called virtual image projection type display device is used, and thus it is possible to provide an inexpensive transmission type display device with a simple configuration.

Still yet another aspect of the invention is directed to a transmission type display device which allows a user to visually recognize a display screen as a virtual image, the display device including a display control section that displays a plurality of image objects for calling respective applications on the display screen; and a display section that displays the plurality of image objects, in which the display control section displays the plurality of image objects over a view field securing region of the display screen and retreating regions which avoid the view field securing region, and displays the image objects in the view field securing region at a higher transmittance than the image objects in the retreating regions in a transmission manner.

According to this configuration, a region (view field securing region) for which a view field is desired to be secured is set, and a plurality of image objects are displayed at a high transmittance in a transmission manner in this view field securing region. Therefore, it is possible to prevent the view field from being hindered by the plurality of image objects to the utmost. In other words, a region where external scenery is viewed can be secured, and thus it is possible to improve visibility of the external scenery.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to the accompanying drawings, a description will be made of a display device, a head mounted display, a display system, and a control method for the display device according to an embodiment of the invention. In the present embodiment, a head mounted display to which a display device according to the invention is applied is exemplified. The head mounted display (HMD) is a display device which is mounted on the head of a user. The head mounted display of the present embodiment is an optical transmission type head mounted display (a transmission type head mounted display, or a see-through type head mounted display) which allows the user to visually recognize an image as a virtual image and to directly visually recognize external scenery (real scenery), and has a glasses shape (a goggle shape).

Figure 1:
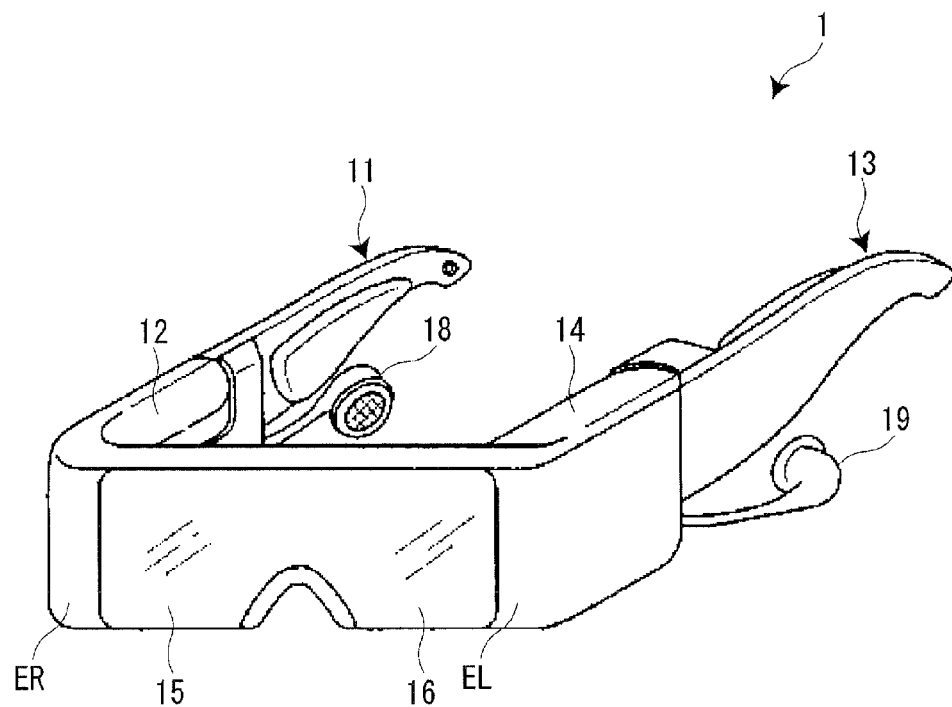
FIG. 1 is an explanatory view illustrating an exterior configuration of a head mounted display according to an embodiment.

As illustrated in FIG. 1, a head mounted display 1 includes a right holding unit 11, a right display driving unit 12, a left holding unit 13, a left display driving unit 14, a right optical image display unit 15, a left optical image display unit 16, a right earphone 18 for the right ear, and a left earphone 19 for the left ear.

The right optical image display unit 15 and the left optical image display unit 16 are respectively disposed so as to be located in front of the right and left eyes of the user when the user wears the head mounted display 1. One end of the right optical image display unit 15 and one end of the left optical image display unit 16 are connected to each other at the position corresponding to the glabella of the user when the user wears the head mounted display 1. The right holding unit 11 extends from an end part ER which is the other end of the right optical image display unit 15. Similarly, the left holding unit 13 extends from an end part EL which is the other end of the left optical image display unit 16.

The right holding unit 11 is a member which is provided so as to extend over a position corresponding to the temporal region of the user from the end part ER of the right optical image display unit 15 when the user wears the head mounted display 1 and so as to be substantially perpendicular to the right optical image display unit 15. Similarly, the left holding unit 13 is a member which is provided so as to extend over a position corresponding to the temporal region of the user from the end part EL of the left optical image display unit 16 when the user wears the head mounted display 1 and so as to be substantially perpendicular to the left optical image display unit 16. The right holding unit 11 and the left holding unit 13 hold the head mounted display 1 on the head of the user in the same manner as temples of glasses.

The right display driving unit 12 is disposed inside the right holding unit 11, that is, on a side opposing the head of the user when the user wears the head mounted display 1 and on the end part ER side of the right optical image display unit 15. In addition, the left display driving unit 14 is disposed inside the left holding unit 13 and on the end part EL side of the left optical image display unit 16.

The right earphone 18 and the left earphone 19 are respectively mounted on the right ear and the left ear when the user wears the head mounted display 1, and output various sounds to the right and left ears.

Figure 2:
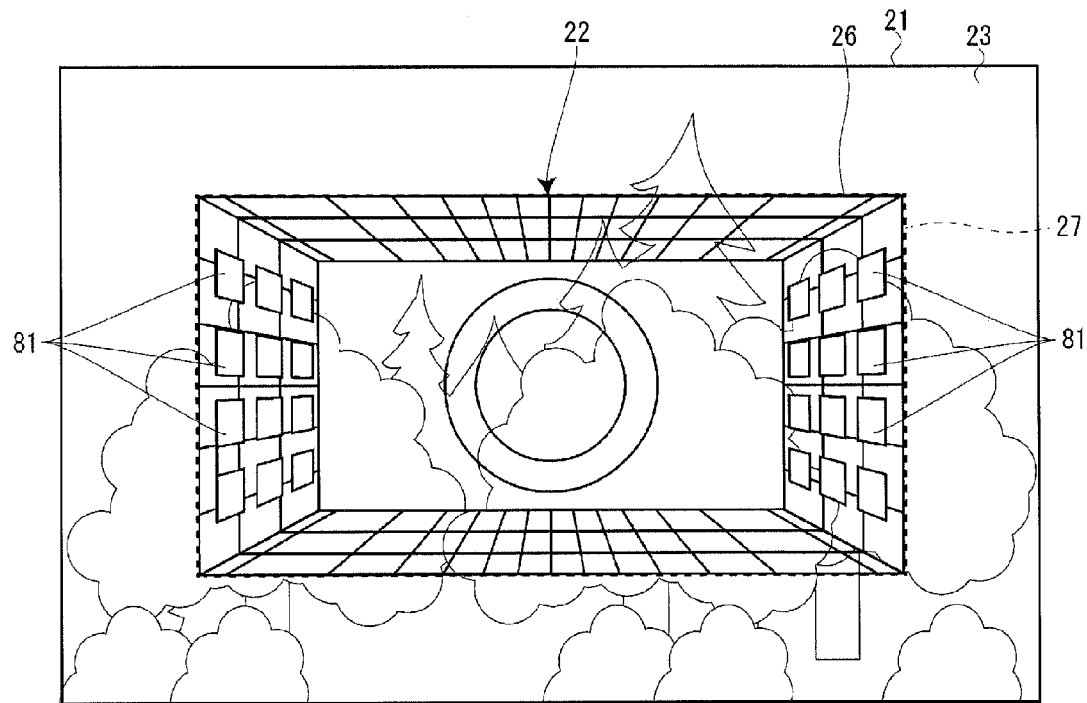
FIG. 2 is a diagram illustrating an example of a virtual image and external scenery which can be visually recognized by a user.

Next, with reference to FIG. 2, a description will be made of an example of a virtual image 22 and the external scenery 23 which can be visually recognized by the user wearing the head mounted display 1. As illustrated in FIG. 2, a display screen 26 generated by the head mounted display 1 is displayed as the virtual image 22 in a view field 21 of the user wearing the head mounted display 1. Here, the display screen 26 in which a plurality of icons 81 for calling respective applications are disposed is displayed, and the display screen 26 is displayed in an entire virtual image display region 27 where the virtual image 22 is displayed (the virtual image 22 can be displayed). As described later in detail, in the present head mounted display 1, visibility of the external scenery 23 is improved by the display screen 26, and a graphical user interface (GUI) for guiding a visual line is realized at a center of the display screen 26. In addition, the user can view the external scenery 23 through the right optical image display unit 15 and the left optical image display unit 16 in the view field 21 of the user. In other words, the user can visually recognize the virtual image 22 and the external scenery 23 altogether within the view field 21.

Figure 3:
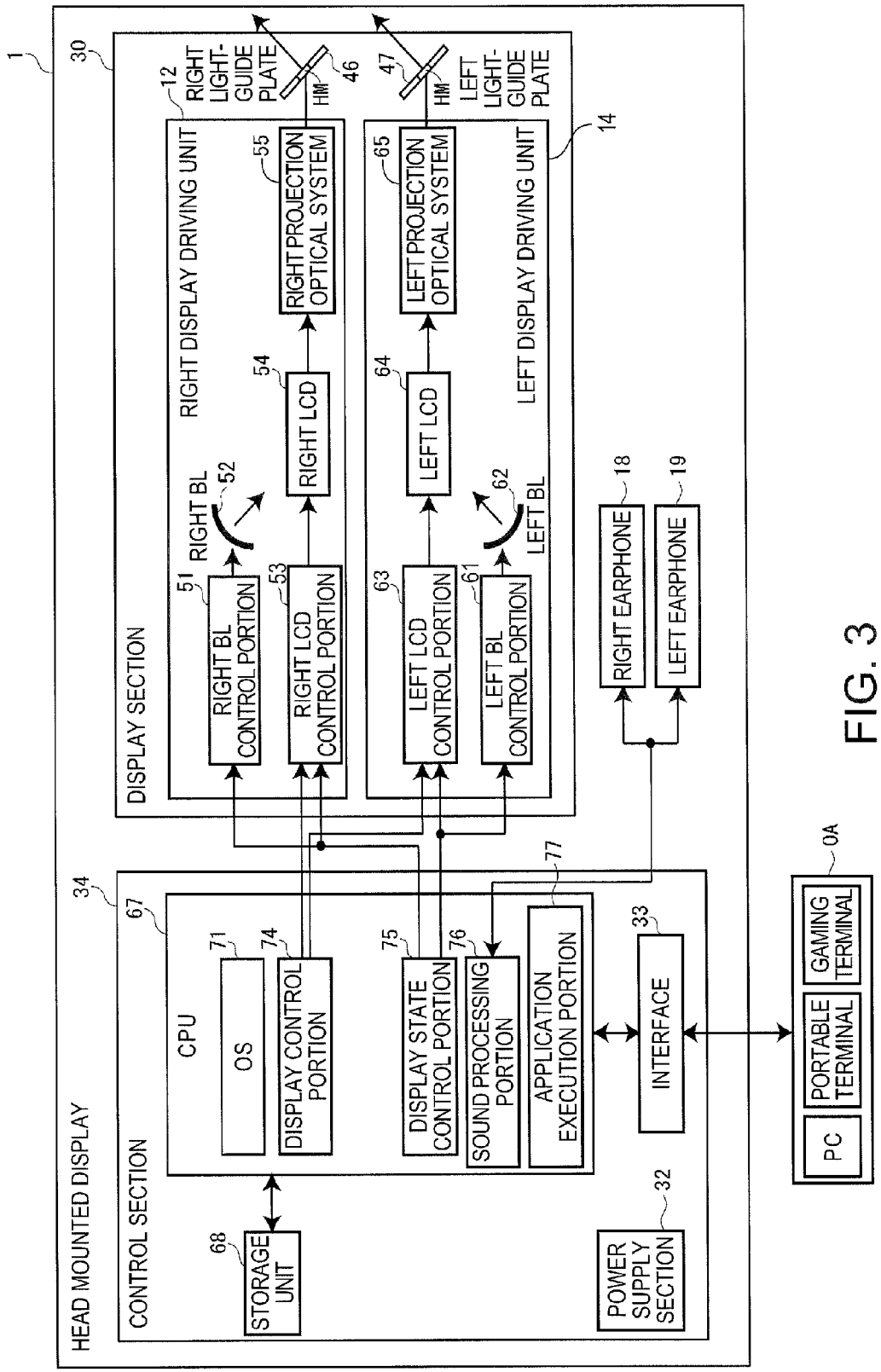
FIG. 3 is a block diagram illustrating a control configuration of the head mounted display.

Next, with reference to FIG. 3, a control configuration of the head mounted display 1 will be described. As illustrated in FIG. 3, the head mounted display 1 includes a display section 30 which allows the user to visually recognize the virtual image 22, the right earphone 18, the left earphone 19, a power supply section 32, an interface 33, and a control section 34 which controls the above-described constituent elements.

The power supply section 32 supplies power to the respective constituent elements of the head mounted display 1. The interface 33 is used for connection to various external apparatuses OA which are supply sources of content such as images (still images and moving images) or sounds. The external apparatuses OA include, for example, a personal computer (PC), a portable terminal (a mobile phone, a smart phone, or the like), a gaming terminal, and the like. As the interface 33, for example, a USB interface, a micro USB interface, a memory card interface, a wireless LAN interface, and the like may be employed.

The display section 30 includes the right display driving unit (image light output unit) 12, the left display driving unit (image light output unit) 14, a right lightguide plate (lightguide unit) 46 which is the right optical image display unit 15, and a left lightguide plate (lightguide unit) 47 which is the left optical image display unit 16.

The right display driving unit 12 includes a right backlight (BL) control portion 51 and a right backlight (BL) 52 which function as a light source, a right liquid crystal display (LCD) control portion 53 and a right LCD 54 which function as a display element, and a right projection optical system 55.

The right backlight control portion 51 controls driving of the right backlight 52 on the basis of an input control signal. The right backlight 52 is, for example, a light emitting body such as a light emitting diode (LED) or an electroluminescence (EL) element. The right LCD control portion 53 controls driving of the right LCD 54 on the basis of input display data. The right LCD 54 is a transmission type liquid crystal panel in which a plurality of pixels are arranged in a matrix.

The right projection optical system 55 projects (outputs) image light which is emitted from the right LCD 54, and is formed by using, for example, a collimator lens. The right lightguide plate 46 as the right optical image display unit 15 is made of a light transmissive resin material and the like and has a half mirror layer HM. The half mirror layer HM reflects image light output from the right projection optical system 55 along a predetermined light path, so as to guide the image light to the right eye of the user. In addition, the right lightguide plate 46 transmits external light (light of the external scenery 23) therethrough, and makes the external light incident to the eye of the user along with the image light. Further, the half mirror layer HM forms the virtual image display region 27. For this reason, when a visual line of the user is located in the virtual image display region 27, the user views the half mirror layer HM, and thus views the external scenery 23 through the half mirror layer HM. On the other hand, if the visual line of the user is moved to outside of the virtual image display region 27, the user views parts other than the half mirror layer HM in the right lightguide plate 46, and thus views the external scenery 23 through the parts.

In the same manner as the right display driving unit 12, the left display driving unit 14 includes a left backlight (BL) control portion 61, a left backlight (BL) 62, a left LCD control portion 63, a left LCD 64, and a left projection optical system 65. A configuration or a function of each constituent element included in the left display driving unit 14 is the same as that of each constituent element included in the right display driving unit 12, and a description thereof will not be repeated here. In addition, the left lightguide plate 47 as the left optical image display unit 16 is made of a light transmissive resin material and the like and has a half mirror layer HM. The half mirror layer HM reflects image light output from the left projection optical system 65 along a predetermined light path, so as to guide the image light to the left eye of the user. Further, the left lightguide plate transmits external light therethrough, and makes the external light incident to the eye of the user along with the image light. In the same manner as in the right lightguide plate 46, in the left lightguide plate 47, the half mirror layer HM forms the virtual image display region 27.

As described above, the image light which is guided to both eyes of the user of the head mounted display 1 forms an image on the retinae of the user, and thus the user visually recognizes the virtual image 22 (the display screen 26) in the virtual image display region 27, for example, as illustrated in FIG. 2. In addition, here, forming an image on the retinae with the image light is referred to as "display".

The control section 34 includes a central processing unit (CPU) 67 and a storage unit 68. The storage unit 68 is constituted by a read only memory (ROM), a random access memory (RAM), and the like, and stores various computer programs. The CPU 67 reads and executes the computer programs from the storage unit 68 so as to function as an operating system (OS) 71, a display control portion 74, a display state control portion 75, a sound processing portion 76, and an application execution portion 77.

The display control portion 74 generates display data, and transmits the display data to the display section 30 (the right LCD control portion 53 and the left LCD control portion 63). The display control portion 74 generates display data of the display screen 26 in which the plurality of icons 81 are disposed, and transmits the display data to the display section 30. Accordingly, the display screen 26 is displayed on the display section 30, and thus the plurality of icons 81 are displayed on the display screen 26. In other words, in the present head mounted display 1, the display data of the display screen 26 is generated and is transmitted to the display section 30 by the display control portion 74 (display control step), and the display screen 26 including the plurality of icons 81 is displayed (an image is formed on the retinae by the image light) by the display section 30 on the basis of the transmitted display data (display step).

The display state control portion 75 generates control signals for controlling the right display driving unit 12 and the left display driving unit 14, and transmits the control signals to the display section 30 so as to control an image display state in the display section 30. Specifically, by using the control signals, the display state control portion 75 individually controls the right LCD control portion 53 to turn on and off driving of the right LCD 54, the right backlight control portion 51 to turn on and off driving of the right backlight 52, the left LCD control portion 63 to turn on and off driving of the left LCD 64, and the left backlight control portion 61 to turn on and off driving of the left backlight 62. Therefore, generation and emission of image light by the right display driving unit 12 and the left display driving unit 14 are controlled.

The sound processing portion 76 transmits audio signals to the right earphone 18 and the left earphone 19 so that the right earphone 18 and the left earphone 19 output sounds.

The application execution portion 77 executes each application in response to a user's operation using the display screen 26. Specifically, the icons 81 of the display screen 26 can be selected (click on the icons can be performed) by a controller (not illustrated), and the application execution portion 77 receives selection of the icons 81 so as to execute (activate) applications corresponding to the icons 81.

Figure 4:
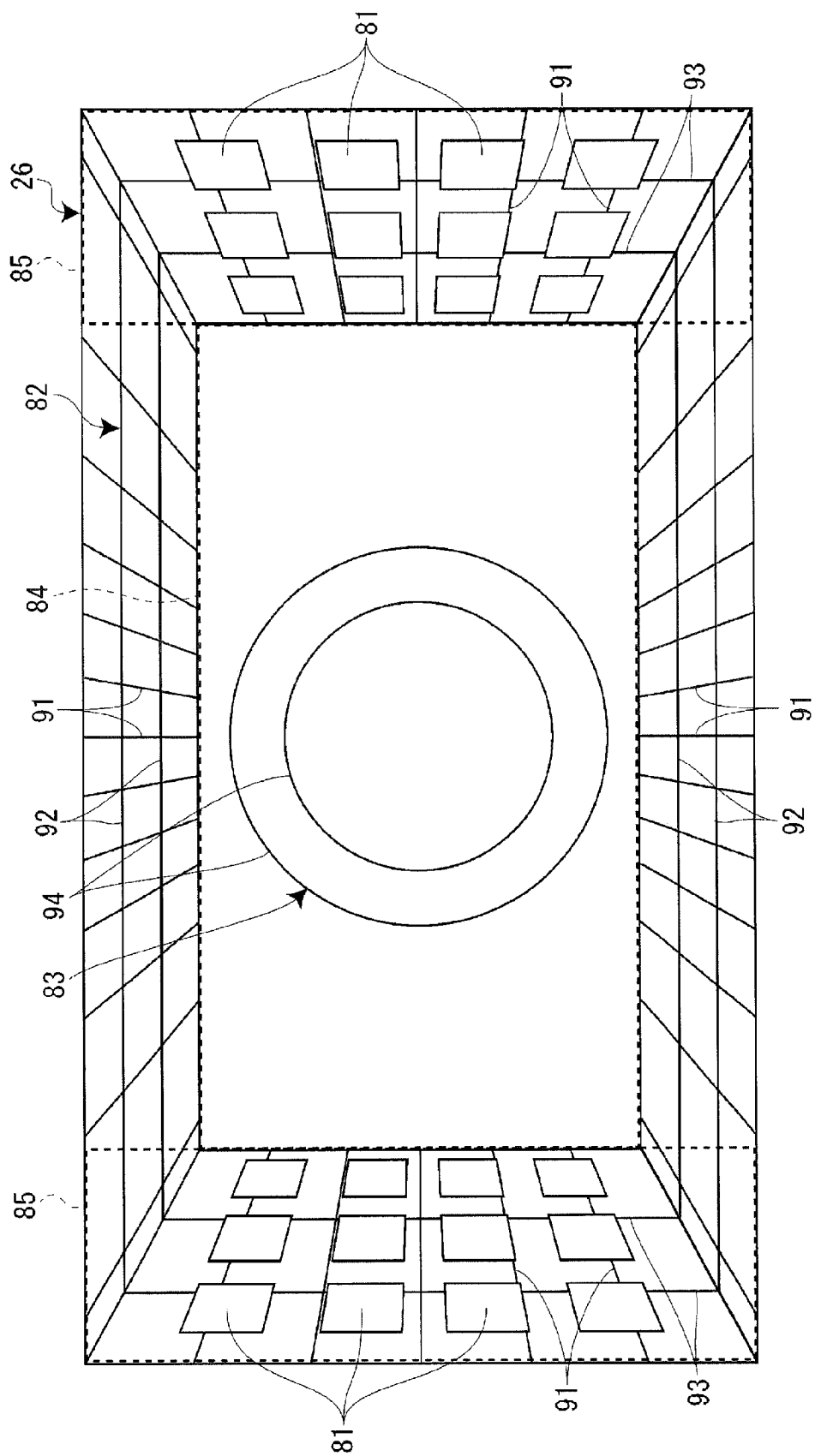
FIG. 4 is a diagram illustrating a display screen.

Next, the display screen 26 of the head mounted display 1 will be described with reference to FIG. 4. The display screen 26 is, for example, a home screen of the head mounted display 1. As illustrated in FIG. 4, the display screen 26 includes a plurality of icons (image objects) 81 which are disposed on the left and right of the display screen 26, a perspective guide 82 which is formed on the entire display screen 26 except for the center, and a double ring-shaped target 83 disposed at the center of the display screen 26. In addition, a view field securing region 84 for viewing the external scenery 23 is set in the center of the display screen 26 in advance. Further, a background of the display screen 26 is displayed in a total transmission manner.

The plurality of icons 81 are disposed only in retreating regions 85 (left and right retreating regions) which retreat to the left and right sides of the view field securing region 84 so as to avoid the view field securing region 84. The plurality of icons 81 are divided into two parts in the left and right retreating regions 85, and are disposed in both of the retreating regions 85. In addition, as each of the icons 81, an image is used in which a rectangular icon image is converted into a perspective image by using perspective. Specifically, an image is disposed in which a rectangular icon image is converted into a perspective image which has the center of the display screen 26 as a vanishing point and is directed toward the inside of the view field securing region 84 (a view field securing region 84 side direction). In other words, a perspective rectangular icon image is disposed. Accordingly, rectangular icon images of the plurality of icons 81 are displayed so as to be attached to the left and right walls in perspective when viewed by the user.

The perspective guide 82 includes a plurality of first guide lines 91 corresponding to vanishing lines, a plurality of second guide lines 92 corresponding to horizontal lines, and a plurality of third guide lines 93 corresponding to vertical lines. The plurality of first guide lines 91 extend from the outer edge side of the display screen 26 to the central side thereof. Specifically, the plurality of first guide lines 91 avoid the view field securing region 84 and extend from the outer edge of the display screen 26 to the front side of the view field securing region 84.

The plurality of second guide lines 92 extend in the horizontal direction, and avoid the view field securing region 84 and are disposed at upper and lower end parts of the display screen 26. On the other hand, the plurality of third guide lines 93 extend in the vertical direction, and avoid the view field securing region 84 and are disposed at left and right end parts of the display screen 26. Therefore, in the upper and lower end parts of the display screen 26, the first guide lines 91 and the second guide lines 92 have forms of a top wall and a bottom wall in perspective. On the other hand, in the left and right end parts of the display screen 26, the first guide lines 91 and the third guide lines 93 have forms of a left wall and a right wall in perspective. In other words, the first guide lines 91, the second guide lines 92, and the third guide lines 93 have a room shape (box shape) without front and rear walls in perspective.

The target 83 is formed by two ring-shaped images 94 surrounding the center of the display screen 26. The two ring-shaped images 94 have different diameters and are formed in a concentric shape having the center of the display screen 26 as a central point.

The plurality of icons 81, the perspective guide 82, and the target 83 function as guiding images which prevent a visual line of the user from being moved to outside of the display screen 26 so as to guide the visual line to the center (central side) of the display screen 26. On the other hand, the plurality of icons 81 and the perspective guide 82 are disposed so as to avoid the view field securing region 84, and thus the view field 21 of the external scenery can be secured. In other words, the GUI using the display screen 26 has both a view field securing function and a visual line guiding function.

As mentioned above, according to the configuration of the present embodiment, the plurality of icons 81 are displayed in the retreating regions 85 of the display screen 26 avoiding the view field securing region 84, and thus it is possible to prevent the view field 21 from being hindered by the plurality of icons 81 to the utmost. In other words, a region where the external scenery 23 is viewed can be secured, and thus it is possible to improve visibility of the external scenery.

In addition, since the central region of the display screen 26 is used as the view field securing region 84, the view field 21 of the center of the display screen 26 can be secured, and thus it is possible to improve visibility of the external scenery.

Further, each icon 81 is in perspective, and thus the icon 81 can be made smaller than the icon 81 which is not in perspective. Therefore, a region where the plurality of icons 81 are arranged can be reduced, and thus a region where the external scenery 23 is viewed can be secured more widely. Furthermore, the icon 81 can be more naturally differentiated than in a case where the icon 81 is just reduced.

Since a background of the display screen 26 is transmitted, it is possible to further improve visibility of the external scenery 23.

In the present embodiment, the icons 81 whose use frequency is high may be preferentially disposed at a front column (an outer column in FIG. 4) in perspective. According to this configuration, the icons 81 whose use frequency is high are easily selected, and thus it is possible to improve convenience thereof.

In addition, in the present embodiment, preferably, when the icon 81 is intended to be moved to the view field securing region 84 through a user's operation, the display control portion 74 cancels (rejects) the operation, and the icon 81 is disposed in the retreating regions 85.

Further, although, in the present embodiment, the plurality of icons 81 which are converted into inward perspective images with respect to the view field securing region 84 are displayed, the plurality of icons 81 which are converted into outward perspective images (a direction opposite to the view field securing region 84) with respect to the view field securing region 84 may be displayed. Furthermore, conversion into the perspective images may be performed when the display control portion 74 generates display data, and the icons 81 which are converted into perspective images in advance may be used.

In the present embodiment, the display control portion 74 displays the background of the display screen 26 in a total transmission manner, but may display the background of the display screen 26 in a half transmission manner.

Figure 5A:
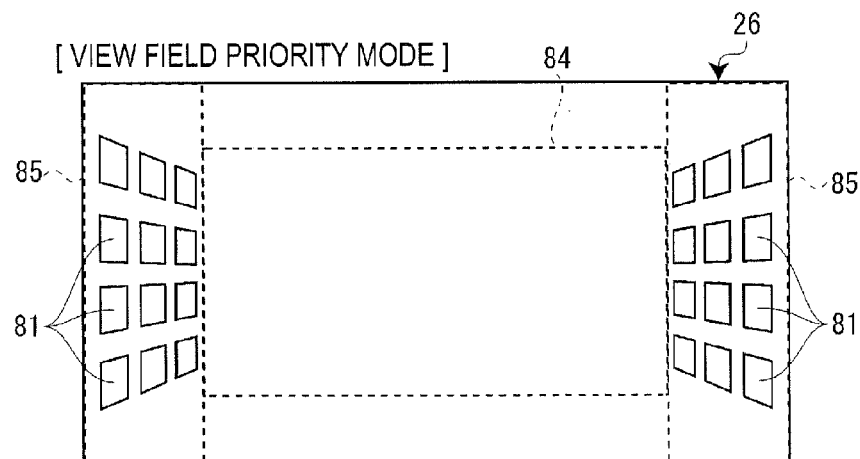
FIGS. 5A to 5C are screen transition diagrams illustrating a display screen in Modification Example.
Figure 5B:
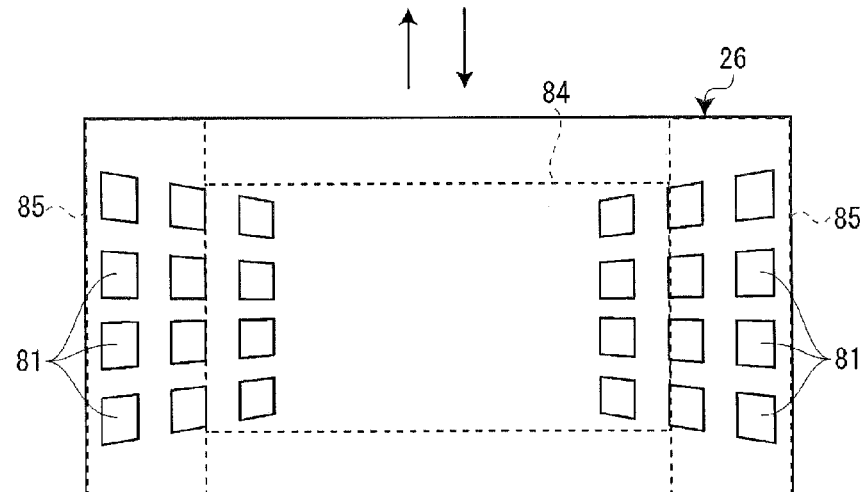
Figure 5C:
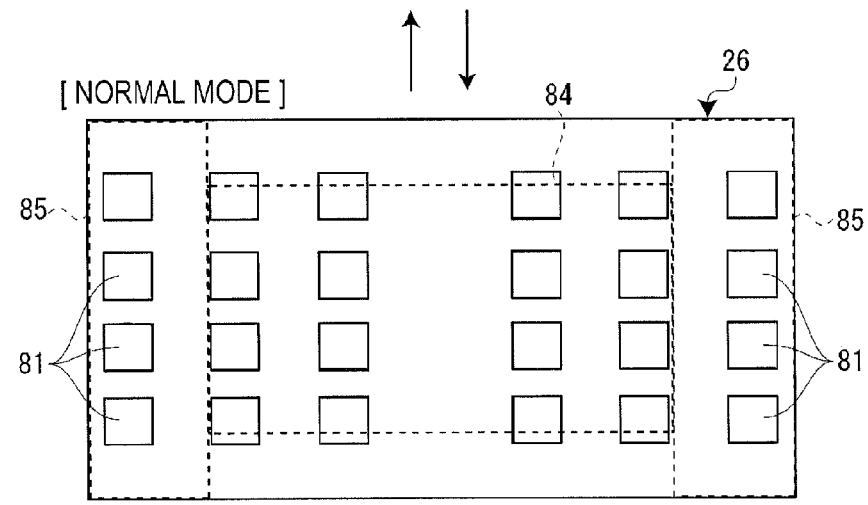

In addition, in the present embodiment, a mode may be set to a view field priority mode (first mode) or a normal mode (second mode), and, as illustrated in FIGS. 5A to 5C, in a case of the view field priority mode, the display screen 26 may be displayed (the perspective guide 82 and the target 83 are not illustrated in FIGS. 5A to 5C). In this case, the CPU 67 functions as a mode setting portion which sets a mode to the view field priority mode or the normal mode. Further, in a case where the view field priority mode is set, the display control portion 74 displays the display screen 26. In other words, the plurality of icons 81 are displayed only in the retreating regions 85, and the plurality of perspective icons 81 are displayed (refer to FIG. 5A). On the other hand, in a case where the normal mode is set, the display screen 26 is displayed without consideration of securing a view field. In other words, the plurality of icons 81 are displayed without avoiding the view field securing region 84, and the plurality of icons 81 which are not in perspective (direct view icons 81) are displayed (refer to FIG. 5C). Therefore, in a case where the normal mode is set, at least some of the icons 81 are displayed in the view field securing region 84. According to this configuration, since the view field priority mode in which the view field 21 is prioritized and the normal mode (operation priority mode) in which operability is prioritized can be appropriately changed, it is possible to improve convenience of the display device.

In addition, as illustrated in FIGS. 5A to 5C, when setting change is performed between the view field priority mode and the normal mode, it is preferable that transition to each display screen 26 be performed as if gate doors of the plurality of icons 81 are gradually closed and opened. The mode setting performed by the mode setting portion may be performed through a user's operation, and may be automatically performed according to a specific condition. For example, in a case where a movement of the user is detected, the setting is automatically changed from the normal mode to the view field priority mode.

In the present embodiment, the retreating regions 85 are regions (left and right retreating regions) which retreat to the left and right of the view field securing region 84 so as to avoid the view field securing region 84, but the retreating regions 85 may be regions (upper and lower retreating regions) which retreat to the upper and lower sides of the view field securing region 84 so as to avoid the view field securing region 84. In addition, the retreating regions 85 may be whole regions which exclude the view field securing region 84 from the virtual image display region 27.

In the present embodiment, the central region of the display screen 26 (the center of the view field 21 of the user) is used as the view field securing region 84, but the invention is not limited thereto. For example, in order to secure a view field for the bottom, the lower half part of the display screen 26 may be used as the view field securing region 84, and the left and right half parts or the upper half part of the display screen 26 may be used as the view field securing region 84. In addition, the view field securing region 84 is not limited to a rectangular region, and may be a circular region and an elliptical region.

In addition, although, in the present embodiment, the plurality of icons 81 are displayed on the display screen 26, the invention is not limited thereto as long as an image object for calling each application is displayed on the display screen. For example, a menu indicating each application or a reduced application screen may be displayed as the image object on the display screen 26.

In addition, a plurality of image objects (for example, the icons 81 or shortcuts) for calling respective files or folders may be displayed on the display screen 26 instead of a plurality of image objects for calling respective applications, and image objects (for example, a radio button, a selection button, a software keyboard, and the like) for performing respective user operations may be displayed on the display screen 26 instead of a plurality of image objects for calling respective applications. Also in this case, the respective image objects are displayed in the retreating regions 85 (a case where the normal mode is set is excluded).

In the present embodiment, a position of a predetermined real object (for example, an obstacle) within a view field of the user may be detected, and an arrangement of a plurality of image objects may be changed on the basis of the detected position. Specifically, there may be a configuration in which the head mounted display 1 further includes an object detection section which detects a position of a predetermined real object within a view field of the user, and, on the basis of a detection result from the object detection section, the display control portion 74 displays the plurality of icons 81 in the retreating regions 85 in a case where the predetermined real object is located in the view field securing region 84, and displays the plurality of image objects in the view field securing region 84 in a case where the predetermined real object is located in the retreating regions 85. According to this configuration, it is possible to secure a view field for a position of the predetermined real object present in the real space, and thus the user can look at the real object.

In addition, in the present embodiment, the plurality of image objects are displayed in the retreating regions 85, but, alternatively, image objects on the view field securing region 84 may be displayed in a transmission manner. In other words, the display control portion 74 displays a plurality of image objects over the view field securing region 84 and the retreating regions 85, and displays the image objects in the view field securing region 84 at a higher transmittance than the image objects in the retreating regions 85 in a transmission manner. A region where external scenery is viewed may be secured by using this configuration, and thus visibility of the external scenery may be improved.

In the present embodiment, the head mounted display 1 includes a controller (not illustrated), and some or all of the display control portion 74, the display state control portion 75, the sound processing portion 76, and the application execution portion 77 may be mounted in the controller. In this case, the controller may be connected to the control section 34, the display section 30, or the like (the display section 30, the right earphone 18, and the left earphone 19) in a wired manner via a cord, and may be connected to the control section 34, the display section 30, or the like in a wireless manner through a wireless LAN, infrared communication, Bluetooth (registered trademark), or the like. Moreover, a function of the controller may be realized by a personal computer (PC), a portable information terminal (a PDA, a mobile phone, a watch type portable terminal, or a smart phone), or the like.

In addition, although, in the present embodiment, a binocular type head mounted display 1 (an optical transmission type head mounted display) is exemplified as a display device, the invention is also applicable to head mounted displays of other types such as a monocular type. Further, although, in the present embodiment, the head mounted display 1 of a glasses type of covering the front side of the eyes is exemplified, the invention is not limited thereto, and is also applicable to a head mounted display of a type of not completely covering the front side of the eyes (a type of covering a part of the front side of the eyes). Furthermore, the invention is not limited to a head mounted display, and is also applicable to other display devices such as a head-up display.

Moreover, although, in the present embodiment, the image light output unit includes the backlight control portions (the right backlight control portion 51 and the left backlight control portion 61), the backlights (the right backlight 52 and the left backlight 62), the LCD control portions (the right LCD control portion 53 and the left LCD control portion 63), and the LCDs (the right LCD 54 and the left LCD 64), this aspect is only an example. The image light output unit may include constituent elements for realizing other types along with the above-described constituent elements or instead of the above-described constituent elements.

For example, the image light output unit may include an organic electroluminescent (EL) display and an organic EL control portion. In addition, the image light output unit may include, for example, LCoS (liquid crystal on silicon; LCoS is a registered trademark) or a digital micromirror device instead of an LCD.

Further, although, in the present embodiment, the invention is applied to the so-called virtual image projection type head mounted display 1, the invention is also applicable to a laser retinal projection type (a so-called retinal scanning type) head mounted display.

Furthermore, although, in the present embodiment, the image light output unit includes the projection optical systems (the right projection optical system 55 and the left projection optical system 65), and projects image light which is emitted from the LCDs, the image light output unit may include, for example, a scanning optical system formed by a MEMS mirror, and a signal light modulation portion (signal light generation portion) which emits signal light to the scanning optical system, instead of the projection optical system. In this case, the signal light which is generated and emitted by the signal light modulation portion is incident to the scanning optical system (MEMS mirror) which is a scanning portion. The scanning optical system emits the signal light as scanning light toward a conductive body having a half mirror layer, and the scanning light is scanned on a surface of the half mirror layer so that a virtual image is formed by the image light. A user can grasp the virtual image with the eyes and thus can recognize an image.

In addition, although, in the present embodiment, the invention is applied to the head mounted display 1, the invention may be applied to a display system in which the head mounted display 1 is connected to an external apparatus OA or an external server via a network. In this case, some or all of the display control portion 74, the display state control portion 75, the sound processing portion 76, and the application execution portion 77 are mounted in the external apparatus OA side or the external server side.

The entire disclosure of Japanese Patent Application No. 2013-160209, filed Aug. 1, 2013 is expressly incorporated by reference herein.

What is claimed is:

1. A head-mounted display device for improving visibility of a line of sight, comprising:
    a head-mounted display screen; and
    a processor configured to:
        convert a plurality of icon image objects for calling respective applications on the head-mounted display screen to a plurality of respective perspective image objects, and
        control the head-mounted display screen to display the plurality of respective perspective image objects for calling the respective applications on the head-mounted display screen in at least one of left and right retreating regions which each avoid a view field securing region positioned at the center of the display screen, wherein
            the perspective image objects has four sides including a distal side vertical edge, a proximal side vertical edge that is longer than the distal side vertical edge, a top side horizontal edge that connects the two vertical edges and that is angled downward from the proximal side vertical edge to the distal side vertical edge, and a bottom side horizontal edge that connects the two vertical edges and that is angled upward from the proximal side vertical edge to the distal side vertical edge, the distal side vertical edge being closer to the center of the display screen than the proximal side vertical edge; and
            the entirety of displayed real scenery is displayed within the view field securing region such that the at least one retreating region does not display real scenery.

2. The display device according to claim 1, wherein the processor is further configured to control the display screen to display the plurality of respective perspective image objects in a front column of a plurality of columns in each of the left and right retreating regions.

3. The display device according to claim 1, wherein the processor is further configured to control the display screen to display the plurality of respective perspective image objects as converted inward or outward perspective images with respect to the view field securing region.

4. The display device according to claim 1, wherein the processor is further configured to:
    set a mode to a first mode or a second mode, and
    control the display screen to:
        display the plurality of respective perspective image objects in the retreating region when the first mode is set, and
        display at least some of the plurality of icon image objects in the view field securing region when the second mode is set.

5. The display device according to claim 1, wherein the plurality of icon image objects are any one of icons, menus, and reduced application screens.

6. The display device according to claim 1, wherein the processor is further configured to control the display screen to display a background of the display screen in a transmission manner.

7. The display device according to claim 1, wherein the processor is further configured to:
detect a position of a predetermined real object within a view field of the user, and
control the display screen, on the basis of a result of the detection, to:
display the plurality of perspective image objects in the retreating regions when the predetermined real object is located in the view field securing region, and
display the plurality of icon image objects in the view field securing region when the predetermined real object is located in the retreating regions.

8. The display device according to claim 1, wherein the processor is further configured to control the display screen to:
output image light;
guide the output image light to the eyes of the user, transmit external light therethrough, and
make the external light incident to the eyes of the user along with the image light.

9. The display device according to claim 1, wherein the processor is further configured to:
detect a position of a predetermined real object within a view field of the user; and
control the display screen to display the plurality of respective perspective image objects in the retreating regions when the predetermined real object is located in the view field securing region, and display the plurality of icon image objects in the view field securing region when the predetermined real object is located in the retreating regions.

10. The display device according to claim 1, wherein the icon image objects in the view field securing region are displayed at a higher transmittance than the perspective image objects in the at least one retreating region.

11. A head-mounted display device, comprising:
a head-mounted display screen; and
a processor configured to:
convert a plurality of icon image objects for calling respective applications on the head-mounted display screen to a plurality of respective perspective image objects; and
control the head-mounted display screen to display: the plurality of respective perspective image objects for calling the respective applications on the head-mounted display screen in at least one of upper and lower retreating regions which each avoid the view field securing region positioned at the center of the display screen by retreating to the respective upper or lower side of the view field securing region, wherein
each of the perspective image objects has four sides including a distal side vertical edge, a proximal side vertical edge that is longer than the distal side vertical edge, a top side horizontal edge that connects the two vertical edges and that is angled downward from the proximal side vertical edge to the distal side vertical edge, and a bottom side horizontal edge that connects the two vertical edges and that is angled upward from the proximal side vertical edge to the distal side vertical edge, the distal side vertical edge being closer to the center of the display screen than the proximal side vertical edge, and
the entirety of displayed real scenery is displayed within the view field securing region such that the at least one retreating region does not display real scenery.

12. The display device according to claim 11, wherein the icon image objects in the view field securing region are displayed at a higher transmittance than the perspective image objects in the at least one retreating region.

13. A transmission type head mounted display device which is configured to be mounted on a head of a user, the head mounted display comprising:
a processor configured to:
convert a plurality of icon image objects for calling respective applications on a head-mounted display screen to a plurality of respective perspective image objects, and
control the head-mounted display screen to display the plurality of perspective image objects in at least one of left and right retreating regions which each avoid a view field securing region positioned at the center of the display screen, wherein
each of the perspective image objects has four sides including a distal side vertical edge, a proximal side vertical edge that is longer than the distal side vertical edge, a top side horizontal edge that connects the two vertical edges and that is angled downward from the proximal side vertical edge to the distal side vertical edge, and a bottom sine horizontal edge that connects the two vertical edges and that is angled upward from the proximal side vertical edge to the distal side vertical edge, the distal side vertical edge being closer to the center of the display screen than the proximal side vertical edge, and
the entirety of displayed real scenery is displayed within the view field securing region such that the at least one retreating region does not display real scenery.

14. A transmission type display system comprising:
a head-mounted display device comprising
a display screen; and
a processor that is configured to:
convert a plurality of icon image objects for calling respective applications on the display screen to a plurality of respective perspective image objects, and
control the display screen to display the plurality of respective perspective image objects for calling the respective applications on the head-mounted display screen in each of upper and lower retreating regions which each avoid a view field securing region positioned at the center of the display screen by retreating to the respective upper or lower side of the view field securing region, wherein
each of the perspective image objects has four sides including a distal side vertical edge, a proximal side vertical edge that is longer than the distal side vertical edge, a top sine horizontal edge that connects the two vertical edges and that is angled downward from the proximal side vertical edge to the distal side vertical edge, and a bottom side horizontal edge that connects the two vertical edges and that is angled upward from the proximal side vertical edge to the distal side vertical edge, the distal side vertical edge being closer to the center of the display screen than the proximal side vertical edge; and the entirety of displayed real scenery is displayed within the view field securing region such that the at least one retreating region does not display real scenery.

15. A control method comprising:

converting a plurality of icon image objects for calling respective applications on the head-mounted display screen to a plurality of respective perspective image objects; and display control step of displaying, on a display screen of a head-mounted display device, the plurality of respective perspective image objects for calling the respective applications on the display screen in at least one of left and right retreating regions which each avoid a view field securing region positioned at the center of the display screen, wherein each of the perspective image objects has four sides including a distal side vertical edge, a proximal side vertical edge that is longer than the distal side vertical edge, a top side horizontal edge that connects the two vertical edges and that is angled downward from the proximal side vertical edge to the distal side vertical edge, and a bottom side horizontal edge that connects the two vertical edges and that is angled upward from the proximal side vertical edge to the distal side vertical edge, the distal side vertical edge being closer to the center of the display screen than the proximal side vertical edge; and the entirety of displayed real scenery is displayed within the view field securing region such that the at least one retreating region does not display real scenery.

16. The display device according to claim 15, wherein the icon image objects in the view field securing region are displayed at a higher transmittance than the perspective image objects in the at least one retreating region.

17. A head-mounted display device for improving visibility of a line of sight, comprising:

a head-mounted display screen; and a processor configured to:

convert each of a plurality of icon images for calling respective applications on the head-mounted display screen into respective perspective image objects which each have four side edges including a distal side vertical edge, a proximal side vertical edge that is longer than the distal side vertical edge, a top side horizontal edge that connects the two vertical edges and that is angled downward from the proximal side vertical edge to the distal side vertical edge, and a bottom side horizontal edge that connects the two vertical edges and that is angled upward from the proximal side vertical edge to the distal side vertical edge, the distal side vertical edge being closer to a center of the display screen than the proximal side vertical edge, wherein each of the respective perspective image objects has the center of the display screen as a vanishing point and are directed toward the inside of the view field securing region; and control the head-mounted display screen to display the plurality of respective perspective image objects in at least one of left and right retreating regions which each avoid a view field securing region positioned at the center of the display screen.

18. The display device according to claim 17, wherein the converted plurality of perspective icon images are displayed so as to be attached to left and right walls in perspective when viewed by the user.

\* \* \* \* \*